United States Patent [19]

Chawan et al.

[11] Patent Number: 4,965,082

[45] Date of Patent: Oct. 23, 1990

[54] METHOD FOR MAKING ALIMENTARY PASTE OR PASTA PRODUCTS WITHOUT THE CONVENTIONAL DRYING STEP

[75] Inventors: Dhyaneshwar B. Chawan, Liverpool; Carleton G. Merritt, Phoenix; Edward A. Matuszak, Liverpool, all of N.Y.

[73] Assignee: Borden, Inc., Columbus, Ohio

[21] Appl. No.: 323,880

[22] Filed: Mar. 15, 1989

Related U.S. Application Data

[63] Continuation-in-part of Ser. 195,803, May 19, 1988, abandoned.

[51] Int. Cl.$^5$ .......................... A21D 2/00; A23D 1/00
[52] U.S. Cl. ..................................... 426/331; 426/395; 426/451; 426/532; 426/557
[58] Field of Search ............... 426/557, 118, 451, 532, 426/395

[56] References Cited

U.S. PATENT DOCUMENTS

4,540,590  9/1985  Harada et al. ...................... 426/324

FOREIGN PATENT DOCUMENTS

| | | |
|---|---|---|
| 0014141 | 3/1982 | Japan . |
| 0202259 | 12/1982 | Japan . |
| 0179448 | 10/1983 | Japan . |
| 0201954 | 11/1983 | Japan . |
| 0002668 | 1/1984 | Japan . |
| 1085157 | 4/1986 | Japan . |

OTHER PUBLICATIONS

An Exhibit relating to a product called Beef Raviolini which is manufactured by Peleon, Inc. of Lakewood, New Jersey.

An Article entitled "Low-Acid Foods Defy Liabilities" by P. C. Vasavada, Ph.D, Prepared Foods, Jun. 1988, pp. 122, 123 and 125.

An Article by J. A. Radley entitled "The Chemistry and Physics of Macaroni Products" from *Food Manufacture*, Nov. 1952, pp. 436-441.

A New Food Preservation Method "Antimold-102 Employing Alcoholic Vapor"; Packaging Japan, 3(10), 1982, pp. 39-45.

*Primary Examiner*—Donald E. Czaja
*Assistant Examiner*—Mary S. Mims
*Attorney, Agent, or Firm*—Beatrice N. Robbins

[57] ABSTRACT

The invention is a process for making packaged uncooked pasta pieces from a feedstock comprising semolina, water and a source of ethyl alcohol wherein the amount of ethyl alcohol is 0.1% to 10% wherein the total moisture content of the feedstock is 26% or less. The extruded pasta can be packaged immediately without any drying step. The extruded pasta when packaged in vapor barrier containers can be sold as "fresh pasta" and may be stored at room temperature on the grocery shelf. The extruded pasta when packaged in a cardboard box will dry to consumer-acceptable dry pasta and can be sold as dry pasta and will keep indefinitely on the grocery shelf.

40 Claims, No Drawings

METHOD FOR MAKING ALIMENTARY PASTE OR PASTA PRODUCTS WITHOUT THE CONVENTIONAL DRYING STEP

FIELD OF THE INVENTION

This application is a continuation-in-part of Ser. No. 195,803 filed May 19, 1988, now abandoned.

In one embodiment, the invention relates to conventional consumer-acceptable dried uncooked pasta that is made without any conventional drying step. The freshly extruded pasta is immediately packaged in paperboard boxes and dries to equilibrium in less than one week. In another embodiment, the invention relates to freshly extruded pasta that is immediately packaged in vapor-barrier pouches and is immediately ready for storage on the grocer's shelf without the need for any processing step.

BACKGROUND

This invention is the result of a further and continuing investigation of developments described in the copending patent application entitled Low Moisture Pasta Process, of Ventres et al., U.S. Ser. No. 39,744, filed Apr. 20, 1987, assigned to Borden, Inc. and incorporated herein by reference.

The present invention relates to making alimentary paste or pasta products that require no conventional drying step. The terms "alimentary pastes" and "pastes", as used herein, refer to the flour and water mixtures commonly known as pasta.

The manufacture of dried, uncooked pasta such as spaghetti, macaroni, noodles, ziti, etc. consists of mixing flour and water to form a paste or feedstock which is extruded through a die under pressure, cut in pieces and dried. Considering the apparent simplicity of the process it would appear to be an extremely easy matter for anyone to manufacture such goods. However, those skilled in the art know that in order for the dried, uncooked pasta to be consumer-acceptable, it should possess good color, have a surface that is not uneven or serrated or "crinkled", and have good tensile strength if it is long goods such as spaghetti; cook up to a pasta that has resisted disintegration, and microbial spoilage, and is not mushy and that these properties are not easy of achievement in a consistent manner.

Alimentary pastes are generally made from coarse, hard flours obtained from hard wheat such as the middlings of durum wheat, often referred to as "semolina flour" or "semolina". Semolina comprises a major portion of the flour in alimentary pastes because it is highly glutinous and provides a self-supporting pasta. Shaped products made from semolina flour will substantially maintain their original form after subsequent processing, such as cooking. The term "cooking", as used herein, refers to the process of gelatinizing the starch and denaturing the protein to form a firm, rigid matrix within the alimentary paste, which occurs upon heating the alimentary paste in boiling water.

Pastas are commercially available in many forms including cooked, partially cooked and uncooked forms. Cooked pasta is defined herein to mean pasta wherein substantially all of the starch is gelatinized. Uncooked pasta is defined herein to mean pasta wherein a major portion of the starch is ungelatinized, i.e., greater than about 80% by weight of the total starch content is ungelatinized. The term "uncooked pasta" includes pasta wherein essentially none of the starch is gelatinized. Starch gelatinization is generally accompanied with protein denaturation. Although protein denaturation is of greater concern, starch gelatinization can be quantified with greater accuracy and is therefore used herein to define cooked and uncooked pasta.

There are advantages to each of these three different types of pasta products; however, the most common form of pasta that is purchased at retail is dry, uncooked pasta. Pasta in this form may be stored at room temperature for long periods of time. In addition, pasta in this form maintains its highly glutinous properties in that a substantial portion of protein is undenatured, and provides a firm paste upon cooking.

Fresh pasta, that is uncooked, packaged pasta, is sometimes available in the refrigerator section of grocery stores. Although fresh, uncooked pasta is relatively expensive because of its high packaging costs and because of its short refrigerator shelf life, many consumers are willing to pay a premium price to get the unique taste and shortened cooking time.

Processes for the commercial manufacture of dry, uncooked pasta are well known. In these processes, water and semolina flour are mixed in an extruder to provide an alimentary paste. This paste or feedstock is forced through holes in the extruder die at a high pressure and at an elevated temperature, to obtain the desired cross-sectional shape. The extrudate is usually cut to desired lengths. In a conventional pasta extrusion process, the feedstock has a moisture level of about 30 weight percent and more and is extruded at a temperature of about 120° F. (49° C.). Moisture levels of at least 30 weight percent are needed to maintain the viscosity of the alimentary paste sufficiently low to prevent excessive pressure within the extruder and to simplify the blending procedure. Temperatures of about 120° F. (49° C.) are utilized to prevent cooking, i.e., gelatinization of the starch and denaturation of the protein.

Drying is the most time consuming step in the preparation of uncooked pastas. The extrudate generally has a moisture level of at least 28% by weight or generally even more which must be reduced to a value of about 10%-13% to permit storage of the product at ambient conditions. The drying step, or steps, may require from about 18-36 hours under careful controlled conditions such as relative humidity of the air, temperature of the air and rate of air circulation around the pasta. Since the pasta is in its final extruded shape, drying is a very delicate operation. Accelerating the drying process may affect the integrity of the finished product since very rapid drying may cause the pasta to warp or crack. However, slowing the drying process by allowing freshly made conventional pasta to dry at ambient conditions not only would result in a dry product with unacceptable integrity, but also the pasta might sour or become moldy.

Reducing the time of this drying period or better still eliminating this conventional drying period without affecting the integrity and quality of the pasta product, would be advantageous when producing dry, uncooked pasta, since the energy expended in the drying process would be significantly reduced, thus reducing the cost of production.

It is known to use low levels of ethyl alcohol in a feedstock of pasta products. Harada et al., U.S. Pat. No. 4,540,590, make a packaged, partially-dried pasta from an ethanol-containing feedstock. The feedstock has a conventional moisture content of at least 30%. Harada et al require that the extrudate be partially dried before packaging. Harada et al require that after packaging, the packaged product be sterilized.

Japanese patent application No. 14141, dated Mar. 12, 1982, describes a method of making cooked noodles from ethanol-containing feedstock. The feedstock must be matured over a period of time before it is molded into pasta pieces and cooked. The alcohol is presumably used to keep the feedstock sterile while it is maturing.

SUMMARY OF THE INVENTION

This invention deals with making pasta products that need no conventional drying step, can be packaged in a pouch made of vapor barrier material and sold as a "fresh pasta product", or can be packaged in paperboard cartons and marketed as conventional uncooked pasta products. The fresh pasta of this invention cooks in shorter time than conventional pasta and does not stick or lump when leftovers are stored in the refrigerator. The process involves the use of a source of food grade ethyl alcohol wherein the amount of ethyl alcohol is 10% or less by weight based on the paste, with or without a reducing agent such as Cysteine (at 500 ppm or less). In the embodiment in which the ethyl alcohol source is pure food grade alcohol of commerce, the product has a "golden yellow", translucent color, which is highly acceptable for durum semolina pasta products.

This invention relates to and uses the process for making pasta products that is described in the Ventres et al. application referred to above. Ventres et al. describe a method of forming shaped alimentary pastes which comprises feeding and blending in an extruder a feedstock comprised of glutinous flour and water, to form an alimentary paste having a total moisture content at or below about 28% by weight, and extruding this alimentary paste by internal pressure, wherein the temperature of the alimentary paste in the extruder attains a value at or above about 130° F. (54° C.) but sufficiently low so as to maintain the extruded alimentary paste uncooked and maintain the level of starch gelatinization below 20 weight percent of the total starch content in said extruded alimentary paste.

The invention is related to the use of low levels of ethanol, less than 10% and preferably about 0.4% by weight, in a pasta dough. The ethanol appears to serve a dual role; (1) it acts as a preservative for a period of time during which the water content of the pasta is high enough to support microbial activity (spoilage), and (2) it is a protein modifier, i.e., it solubilizes the protein thereby disrupting the chain shape and allowing the protein to flow around each discrete starch particle. The result is a softening of the pasta dough which facilitates extrusion at low moisture contents. The extruded product does not crack or exhibit streaks as would be evident in the absence of alcohol.

The presence of up to 10% alcohol on a moisture free basis allows the feedstock to be extruded at a temperature as low as 120° F. and allows the moisture content of the feedstock to be 26% or less by weight of the feedstock and preferably 24% or less by weight of the feedstock. It is theorized that the low moisture level feedstock of this invention (i.e., ≦26% moisture) can be extruded as uncooked pasta by the selection of an appropriate combination of temperature and pressure at the die head of the extruder, because the alcohol acts as a gluten plasticizing agent and this facilitates extrusion.

In one embodiment, the invention is a dried pasta made from the freshly formed shaped pasta. The invention in this embodiment differs from a comparable embodiment of the Ventres et al. application in that the conventional "drying" of pasta after extrusion has been completely eliminated. The reason this is possible is because low levels of ethanol are in the feedstock. The ethanol is believed to act as a drying agent as well as an antimicrobial agent. The freshly formed, shaped pasta may be packaged immediately in a conventional paperboard package. When the product is packaged in a conventional paperboard package, it loses moisture as well as alcohol to a point of equilibrium at a moisture content of 10% to 12% by weight, resulting in a pasta product that is golden yellow and more appealing than conventionally dried pasta.

In another embodiment, the freshly formed shaped alcohol-containing pasta is packaged in a vapor barrier pouch, and is storable on the grocer's shelf without requiring refrigeration. The freshly formed shaped pasta that is packed in a vapor barrier pouch remains soft and cooks in a shorter time than the conventional pasta.

DETAILS OF THE INVENTION

It has been found that highly acceptable pasta products can be prepared by utilizing standard pasta processing techniques while eliminating the costly and time consuming conventional drying step.

In performing the process of this invention, a feedstock comprised of glutinous flour, water and ethyl alcohol is utilized. The term "glutinous flour" as used herein is intended to include and describe flours which provide a self-supporting paste when mixed with water. Such a self-supporting paste, once shaped, will substantially retain its original form under ambient conditions or after subsequent processing, such as drying or cooking.

Semolina flour, also referred to as "semolina" herein, is a common, hard, coarse, wheat flour obtained from durum wheat. The definition or "Standard of Identity" for semolina flour is generally a flour obtained from durum wheat which passes through a 20 mesh sieve and not more than 3% by weight passes through a 100 mesh sieve. There are different grades of semolina having different glutinous properties. Both high grade and low grade semolina flours are intended to be included in the glutinous flours suitable for this invention. Other coarse, glutinous flours, obtained from more uncommon grains may be used in place of semolina and are intended to be included within the scope of the term "glutinous flour". In addition, fine flours such as durum flour, wherein 98 weight percent passes through a 70 mesh sieve, are also suitable and are intended to fall within the scope of the term "glutinous flour" as used herein. These fine flours may be preferred where it is difficult to obtain adequate blending with water from the equipment utilized.

The only requirement for the flour is that it provide a self supporting paste upon admixture with water. The glutinous flour preferably comprises at least 75% by weight of the dry ingredients used. Preferred glutinous flours are semolina and durum flour. Non-glutinous flours, which do not provide a self-supporting paste upon admixture with water, such as rice flour, may be added to the feedstock although they do not fall within the scope of the term "glutinous flour" as used herein. Other additives, including seasonings, vitamins, dyes, egg, flavorings, such as cheese, beef and chicken, and vegetable solids such as spinach, may be added for flavor, color, nutrition or other additive effect.

Water is a necessary part of the feedstock for the extrusion process of this invention since glutinous flours, such as semolina flour, do not have a water content sufficiently high to provide a low viscosity alimentary paste which can be extruded without significant cooking of the paste. Preferred feedstocks exhibit a moisture content greater than about 18 weight percent. However, lower values for moisture content in the feedstock are suitable where flow modifiers are used. Semolina flour typically has a moisture content of 12-15 weight percent. In practicing this invention, the quantity of added water provides a total moisture level for the feedstock which does not exceed 26% by weight (including the moisture present in the flour(s) used and the moisture present in the alcohol, if any). The total moisture level for the feedstock preferably does not exceed 24% by weight.

The moisture content of the glutinous flour, the alimentary paste feedstock, the extruded alimentary paste and the dried pasta product, respectively, may be determined by the procedures set forth in the 9th Ed., *Association of Official Analytical Chemists* (AOAC), Method 13.112, which is incorporated herein by reference. Other methods are also suitable but the AOAC procedures, incorporated above, are used to define the moisture values reported herein.

The term "water", as used herein, refers to potable water, including tap water, well water, spring water and the like, as well as to substantially pure forms of water, such as distilled water. If desired the necessary water can be added as milk, broths, fruit juices and the like. Furthermore, the term "water", as used herein, includes water in all physical states, such as steam, ice and liquid.

Ethyl alcohol is a necessary part of the feedstock of this invention. An ethyl alcohol and water mixture can be used to provide the ethyl alcohol required for the feedstock and in the case when a ethyl alcohol and water mixture is used, the water in the ethyl alcohol and water mixture would be considered to be part of the total water content of the feedstock. Appropriate amounts of alcoholic beverages such as wine, beer, distilled spirits and the like can be used to provide all or part of the ethyl alcohol required for the feedstock and in the case when alcoholic beverages are used, the non-alcoholic part of the alcoholic beverage would be considered to be part of the total water content of the feedstock.

It was contemplated and it was then found that in the embodiment of the invention in which freshly formed shaped alcohol-containing pasta is packaged in a vapor barrier pouch, it may be desirable to add to the feedstock a suitable amount of an osmophilic yeast and mold inhibitor as for example up to 0.2% by weight based on the feedstock of sodium propionate, potassium propionate, sodium sorbate or potassium sorbate or mixtures thereof.

The addition of osmophilic yeast and mold inhibitor to the feedstock is not necessary if conventional wine is used in the feedstock as a source of ethyl alcohol because such wines contain yeast and mold inhibitor. In the examples in which no yeast or mold inhibitor was in the feedstock because pure ethyl alcohol was the only source of alcohol in the feedstock, the growth of mold was evidenced in packaged vapor-barrier pouches over time except for a few cases. The exceptions occurred when the extruded pasta was placed in the vapor barrier pouches at the moment of extrusion (while still hot) so that the extrudate was not exposed to ambient conditions before packaging. In order to be sure that no growth takes place in the packaged vapor-barrier pouches, several options are available. Yeast and mold inhibitor may be incorporated in the feedstock in one way or another, or the freshly packaged vapor-barrier pouches can be heat treated by known methods including microwave heating to thereby inhibit the growth of any osmophilic fungi that may have entered the pouch at the time of packaging.

Special mention is made of two useful additives, salt and glycerol monostearate. These are two ingredients commonly found in commercial pastas. Salt provides flavor while glycerol monostearate functions as an emulsifier or lubricant, i.e., flow modifier, which reduces the viscosity of the alimentary paste, making extrusion easier. The use of glycerol monostearate will reduce the pressure within the extruder. Also suitable are the flow modifiers or "modifying agents" disclosed by Craig et al. in U.S. Pat. No. 3,762,931, i.e. whey solids in conjunction with sulfhydryl reducing substances, such as L-cysteine, glutathione and sulfite salts (sodium bisulfite and calcium sulfite). The description of these "modifying agents" at column 6, line 57, to column 8, line 43, of Craig et al. is incorporated herein by reference. In the examples of this invention, the flow modifier glyceryl monostearate was used. Other monoglycerides and mono-di-glyceride mixtures are available and should also be useful. However, the addition of flow modifier or "modifying agents" is not essential.

The components of the feedstock may be separately introduced to the extruder or they may be premixed to form a preliminary paste. Commercial equipment is available for handling both types of feedstocks. To ensure a uniform product however, separate metering of the feedstock components is often preferred.

The term "extruder", as used herein, refers to those devices which generally comprise a threaded screw positioned within a barrel having a means for receiving components to be mixed, such as a feed hopper positioned at one end, a means for discharging mixed components at the opposite end of the device, and a means for rotating the screw within the barrel. An example of a discharging means is a die having holes for the passage of the mixed materials, positioned at the end of the screw. The temperature within an extruder may be controlled by the use of a water jacket which surrounds the barrel, if desired. Conventional extruders utilized in the preparation of alimentary pastes or plastics are well suited for this invention. These include both single screw and twin screw extruders. Examples of suitable extruders include those marketed by Brabender, Mapimpianti (GF 20 series), Buhler, DeMaco, and Braibanti.

The alimentary paste is forced through the holes of the extruder die to obtain the desired shape. The holes in the extruder die prescribe the profile of the paste. The paste passes through the die due to internal pressure generated by the rotating screw or screws. The extruded paste may be cut to pieces of desired lengths. Cutting generally occurs at the extruder die. Cutting is not essential to the practice of this invention since the alimentary paste may be formed into desired lengths by pulling the extrudate away from the die. All conventional pasta shapes may be produced in practicing this invention.

An important process variable is the temperature at which the alimentary paste is blended within the extruder. The temperature must be sufficiently low to maintain the paste uncooked, i.e., to maintain more than 80% by weight of the total starch in the paste in an ungelatinized state, preferably 90% or more. The upper temperature limit may vary since starch gelatinization is dependent on many variables such as moisture level, the particular flour being used, paste composition, process equipment, etc. Because of this multiple dependency, at temperature values significantly below the upper limit, a minor change in temperature may not be accompanied by a corresponding change in starch gelatinization.

Some starch gelatinization and some protein denaturation always take place during extrusion, even under conventional or "standard" operating conditions. This is due to the high shear environment within the extruder, where heat and pressure are generated internally. Starch gelatinization below about 10 weight percent of the total starch content is considered to be normal for conventional extrusion processes. It is preferable to maintain the level of starch gelatinization below about 10 weight percent where dry, uncooked pastas are the desired end products because such values are often accompanied by desirable low levels of protein denaturation.

Protein denaturation during extrusion is preferably kept at as low a level as possible. The optimum paste temperature will vary with the level of moisture within the alimentary paste. Lower moisture values in the alimentary paste generally permit the paste to be processed at higher temperatures without significant protein denaturation. In the Ventres et al application referred to above paste temperatures as high as 190° F. (88° C.) had little effect on protein denaturation and starch gelatinization during the extrusion of pastes at or below about 20.8 weight percent moisture content.

Protein denaturation prior to cooking and consumption of the alimentary paste often results in a weak protein matrix and an infirm or mushy cooked pasta. Premature protein denaturation is evidenced by a product loss upon cooking in boiling water due to the release of starch. A product loss below about 10 weight percent of the total pasta weight upon cooking in boiling water is average for pasta products produced by conventional extrusion techniques. It is desirable to maintain the product loss at or below this level.

The temperature of the paste may vary within the extruder because of the heat that is generated by friction at different points within the extruder. The temperature of the paste can also vary because it passes through different cooling or heating zones along the length of the extruder barrel. This may be desired where blending is intensified at separate locations in the extruder or components of the paste are added downstream of the feed hopper. However, the highest temperature experienced by the alimentary paste should a temperature sufficient to permit flow and should be sufficiently low so as to maintain the paste uncooked, preferably below 190° F. (88° C.). The process may be performed continuously, semi-continuously or batch-wise.

It is preferable to utilize a temperature that is at or above 120° F. and which is sufficiently high to maintain the internal pressure on the extruder die below about 250% of the values experienced at standard conditions. The phrase "standard conditions", as used herein, refers to those experienced in conventional paste extrusion operations where the combination of an extruder barrel temperature of about 120° F. and an alimentary paste moisture content of about 30 weight percent are the norm. The pressures generated under such conditions are generally below 2000 psig in conventional commercial extruders. These pressure values will vary with the equipment utilized.

It is preferable to maintain the level of starch gelatinization below 10 weight percent of the total starch content, and the product loss below 10 weight percent of the total pasta product upon cooking. Those skilled in the art will be capable of obtaining a proper balance of alimentary paste moisture content and operating temperature to achieve these results. The paired values which appear in the examples of the Ventres et al. application referred to above will serve as a guide.

Different levels of gelatinization and denaturation may occur for different blends of alimentary paste and for different types of equipment utilized.

Where conventional equipment is utilized, preferred barrel temperatures fall in the range of about 70°-140° F. Heat generated by friction within the extruder is often more than sufficient to provide the necessary operating temperatures. Alternatively, the extruder barrel may be heated by external water jackets or by an electrical resistance heater.

A further step in easing the pressure within the extruder is to heat the die head of the extruder to approximate the temperature of the extruder barrel and the paste within. This can be accomplished with a conventional electrical resistance heating element, disposed about the die head. When the die head is heated, die pressures may be maintained within about 120% of the values for pressure at standard conditions of a barrel temperature of 120° F. (40° C.) and a paste moisture content of 30% by weight.

When the alcohol-containing feedstock of this invention is extruded from the die, the extruded alimentary paste may be packaged immediately, without any conventional drying step. The extruded product need not be exposed to the usual heated drying at all, but may be cut into pieces, if desired, and the pieces can be immediately packaged in any of at least two ways. The pasta pieces can be sealed in a vapor-impermeable pouch whereby some ethanol remains in the pasta and/or in the pouch until the pouch is opened and the pasta is put in water and boiled, at which time the ethanol volatilizes. Alternatively, the pasta pieces can be put in a standard porous cardboard box. In contrast, if a conventional pasta was extruded and immediately put in a cardboard box without conventional drying, the pasta would spoil and crack and crumble in the box over time to give a product that would fall apart when cooked in boiling water. The presence of the ethanol in the product of this invention inhibits spoilage while the product is drying in the box down to an equilibrium moisture content of 11-12%. The resulting product of this invention retains the desirable golden yellow color, exhibits excellent dry shelf stability and when cooked has good pasta taste and texture.

The process of the Ventres et al., application, referred to above, resulted in a dried pasta product having a streaked or variegated appearance that disappeared upon cooking. The pasta of the present invention dries to a product with virtually no streaking.

The extruded pasta of this invention has been found to retain more of the Beta-carotene and other carotenoids, such as alpha-carotene and gamma-carotene, originally present in glutinous flour than conventional extruded pasta retains. The enhanced carotenoid content improves the natural yellow color of the paste particularly when semolina flour is used. The processes of this invention generally result in the production of pastas having uniform coloration. It has been found that highly acceptable pasta products can be prepared, using the processes of this invention, while eliminating the costly and time-consuming conventional drying step.

This innovation is accomplished by the use of low levels of ethanol in the dough which facilitates as a gluten plasticizing and preserving agent. Pasta made by this process, when packaged in a conventional paperboard package or other suitable container, loses moisture as well as the alcohol to a point of equilibrium (10 to 12% moisture), as in the case of conventional pasta drying.

Furthermore, with or without the addition of reducing agents such as cysteine during processing, the products produced are more acceptable in color, flavor, and texture than the conventionally dried pasta.

In addition, the pasta product, when packaged in a vapor barrier pouch, does not lose volatiles and will have good keeping qualities without refrigeration on the grocer's shelf because alcohol is an antimicrobial agent. If the alcohol is not part of an alcoholic beverage that contains yeast and mold inhibitor, a yeast and mold inhibitor should be added to the feedstock unless other steps are taken to stop the growth of osmophilic yeast and osmophilic mold in the packaged vapor barrier pouches such as heat treating of the packaged pouches. This product, which can be distributed as "Fresh Pasta" remains soft and cooks in a shorter time than the conventional dried pasta.

Acceptable feedstock formulation proportions are shown in Table 1.

TABLE 1

| Acceptable Formulation Compositions of the Feedstock | |
|---|---|
| Ingredient | Weight Percent In Feedstock Formulation |
| Semolina* (Durum, dry basis) | 76–82 |
| Water (total, including moisture content of the flour and of the alcohol, if any) | 14–24 |
| Glyceryl Monostearate | 0.1–2 |
| Ethyl Alcohol (anhydrous) | 0.1–10 |
| **L-Cysteinehydrochloride | 0.01–0.2 |

*the moisture in the semolina is included in the total amount of water
**optional Acceptable mixing procedures in making the pasta products of this invention include premixing of dry ingredients in Hobart Cutter/Planetary Mixer. The water and alcohol may be added in three ways: (1) as a liquid-liquid mix; (2) as a liquid alcohol together with ice; or (3) as a frozen mixture of alcohol and water. Cysteine, if used, may be added to the mixture of alcohol and water before it is frozen.

The manufacturing procedure of this invention is as follows. The dough is fed into a pasta extruder/former/press and, with or without vacuum, is continuously forced through a die orifice yielding various pasta extrudate configurations depending upon the die used. Individual pieces are formed with a cutoff knife.

It is contemplated that instead of forcing the dough of the invention through a die, the dough could be sheeted by forcing the dough through pressure rollers. The sheeted product could then be handled in the same way as the extruded product (i.e. cut into pieces and packaged in paperboard cartons or in vapor barrier pouches).

The acceptable parameters of the extrusion procedures are shown in Table 2.

TABLE 2

| Acceptable Parameters for the Extrusion of Feedstocks | |
|---|---|
| Parameters | Suitable Parameter Values |
| Barrel Temperature | 70°–140° F. |
| Screw Temperature | 100°–160° F. |
| Vacuum | 0 to −60 cm Hg* |
| Head Temperature (at die) | 120°–160° F. |
| Pressure (at die) | 1000–4500 psig |

*no (0) vacuum denotes an absolute pressure of about 76 centimeters (atmospheric pressure) and −60 cm Hg vacuum denotes an absolute pressure of about 16 centimeter of mercury.

The raw, cut pieces of the extruded pasta may be packaged in paperboard cartons; or in vapor barrier pouches.

EXPERIMENTAL: GENERAL

The feedstock used in all of the examples below was prepared from about 6,000 grams of semolina or durum flour having about a 12.4% moisture content unless otherwise specified. The quantity of added water used is specified in each example.

Glycerol monostearate and semolina flour were initially mixed in a Hobart Cutter/Planetary mixer for a period of two minutes at the lowest speed. (In the examples in which glycerol monostearate was not used, only semolina flour was placed in the mixer and the period of mixing was omitted.) Water/ice was then added slowly to the Hobart mixer over a period of 2-4 minutes while the mixer was in operation. Following the addition of the water, the feedstock mixture was allowed to mix for about 4 minutes. The reported moisture contents of the paste and flour were determined by the procedures described in 9th Ed. AOAC, Method 13.112.

The premixed feedstock which is free flowing (not lumpy) was then placed in the "former vessel" of the Mapimpianti GF 20 extruder (available from Mapimpianti, Padova, Italy). Only the F-20 section of the Mapimpianti extruder was used. The screw used was about 20.5 inches (520 mm) long with an 80 mm diameter for about the first 4 inches (100 mm) and a 56 mm diameter for the remaining 16.5 inches (about 420 mm). The shaft of the screw was hollow with an opening at each of the two ends of the shaft. Means was provided which allowed hot water to be continuously circulated through the shaft and thereby heat the feedstock. Hot water was flowed into the end corresponding to the feedstock inlet and flowed out at the end corresponding to the feedstock extrusion area. The screw operates at a maximum speed of 160 rpm. In the experiments, the screw was operated at about 10% to about 30% of the maximum speed. The extruder held about 800 grams of paste. The dwell time in the extruder was from 40 to 100 seconds. A Maldari#43077 die was used. It had openings of about an 5.0 mm diameter and a wall thickness of about 0.9 mm. In all examples, the extrudate was cut at the die to provide elbows about one inch in length. A conveyor removed the elbow products.

The F-20 section of the GF 20 extruder was modified to accommodate the premixed feedstock by removal of the feed mechanisms for the separate addition of water and semolina and by covering each opening in the barrel for the separate feeds with a 6×4 inch plate. The extruder water jacket, which surrounds about ¾ of the final portion of the extruder, was split into two sections and equipped with independent control systems. Water having a temperature about equal to the desired barrel temperature was circulated through the extruder water jackets from a ten gallon (about 38 liters) reservoir.

Water was used to heat the extruder prior to start up and to maintain a substantially constant temperature during operation. Cold water was added to the reservoir as needed. The opening to the "former vessel" of the extruder was reduced from 3 inches to 1 inch by welding a stainless steel plate thereto to prevent back-feeding of the premixed feedstock.

After the extruder barrel was filled with paste by starting the extruder, the pressure could be reduced in the former vessel by a vacuum pump, if desired. The temperature of the premixed feedstock for each example was about 70° F. (21° C.). The values reported in each example for the barrel temperature reflect the average temperature of the circulating water in each water jacket, throughout the extrusion, as measured by appropriate measuring devices inserted in the water jacket.

The moisture level for the extruded paste reported in each example is an average of the measured values for the first and last samples of elbows extruded from a given feedstock. These samples were sealed in glass jars and the moisture contents determined. A difference in the moisture content for the initial extrudate sample and final extrudate sample of about 2% by weight of the total alimentary paste was common in the examples reported.

A 1000 watt electrically heated band was wrapped around the die housing with a 22 amp variable power stat to heat the die head where applicable. Pressure on the die (extruder die) was determined by the use of a hollow tube gauge positioned just ahead of the extruder die.

The following examples further demonstrate and illustrate the invention. In the examples and throughout the specification, all temperatures are expressed in degrees Fahrenheit. All percentages are by weight, unless otherwise indicated.

The glycerol monostearate used was MYVAPLEX 600, monoglyceride, obtained from Eastman Kodak.

In the examples where 200 proof ethyl alcohol was used, the ethyl alcohol used was obtained from the Aaper Alcohol Company of Kentucky in a container that held five gallons of pure ethyl alcohol (200 proof).

In Example 6–21 the wines that were used as sources of ethyl alcohol were wines obtained from the Monarch Wine Company of Georgia which company has a sales office on Milltown Road in North Brunswick, N.J. The Monarch Wines used were bought in industrial quantities. Monarch Wines contain 0.1% by weight of potassium sorbate as a yeast and mold inhibitor.

The paperboard cartons used to package the freshly extruded pasta pieces (i.e. small elbows) were standard cardboard cartons of commerce. The cartons were made of sulfite beached paperboard and had the following dimensions $3\frac{3}{8}''\times1\frac{3}{8}''\times7\frac{1}{4}''$.

The vapor barrier bags used to package the freshly extruded pasta were made of polyester film with the following dimensions $6\frac{1}{2}''\times8''$ and a plastic thickness of 4½ mils (0.143 mm). In order to test the keeping qualities of the air-tight packaged freshly extruded pasta, standard mold count tests were run.

In a standard mold test, the culture medium of a standard plate is inoculated with a sample of the food to be tested. After the plate has been inoculated and covered, it is incubated at 37° C. for seven days. At that time a mold count is made, i.e. the number of mold spores is determined. A mold count of less than 10,000 per gram of food is considered to indicate that the spores present in the food could not grow and multiply.

In each of the runs of the examples, pasta pieces that had been dried to equilibrium inside closed cardboard boxes were cooked in boiling water. After cooking, the drained pasta was weighed and the drain water was weighed. The procedure used was as follows: 1500 grams of water was heated to boiling (about 100° C.) in a pot that was equipped to allow any vapor that evolved during cooking to be condensed and fed back into the pot, 50 grams of dry pasta was added, and the mixture was heated as little as possible but enough to maintain a boiling temperature for 15 minutes. The drain water was weighed and the cooked pasta was weighed. The solids content of the drain water was determined and the % solids loss based on the weight of the uncooked pasta was calculated. To make a good cooked pasta it is preferable to have a product loss of below about 10% of the total pasta products upon cooking. However, a product loss of up to about 15% is acceptable. In the tests of the examples the product loss in two cases was 15% and more. However, it is contemplated that high product losses came about because a standard cooking time of 15 minutes was used. It is contemplated that new cooking directions will have to be formulated for some of the products. It is contemplated that a cooking time of something less than 15 minutes is required to cook some of these pastas.

EXAMPLES 1–5

SOURCE OF ALCOHOL IS PURE ETHYL ALCOHOL

EXAMPLE 1

Production of Elbows Without a Drying Step 708.9 grams of water, 29.65 grams of ethyl alcohol and 2.63 grams of L-cysteinehydrochloride were mixed together and frozen. After the "water mixture" was frozen, the dough was prepared as follows. 6000 grams of semolina flour (King Midas, 12.4% water) and 22.5 grams of glyceryl monostearate were mixed together in the Hobart Cutter Mixer for one minute. The "Water Mixture" (in frozen and chipped form) was then added and mixing continued for 4 minutes until the ice mixture completely melted.

The dough was then fed into the pasta extruder without vacuum and was continuously forced through the die. Individual elbow-shaped pieces were formed with a cut-off knife. The dwell time in the extruder was in the range of 300 seconds. Temperatures were recorded as follows: barrel in: 70° F.; barrel out: 72° F.; screw in 140° F.; screw out: 136° F.; and die head temperature: 142° F. The die pressure was measured at 3820 psig.

The raw, cut elbows were packaged immediately without any drying step. About 500 elbows with a total weight of 170 grams were packaged in each paperboard carton. About 290 elbows with a total weight of 100 grams were packaged in each vapor barrier pouch. About one-third of the elbows were packaged in cartons and about two-third of the elbows were packaged in pouches.

The moisture content of the pasta pieces that were kept in an unopened carton for three days was measured at 14.27%. The alcohol content of pasta pieces that were kept in an unopened cardboard carton for seven days was measured at less than 0.0162%, and the moisture content was measured at 9.52%.

Pasta pieces that were kept in an unopened vapor barrier pouch at room temperature for nine days, were tested and the following results were obtained. The moisture content was 20.32%. The alcohol content was 0.0672%. The mold test was negative. The total plate count per gram was 2200.

The pasta pieces were examined visually upon extrusion and at the time the packages were opened. In all cases the pieces had a desirable yellow color.

Dry pasta pieces that had been dried to equilibrium inside the closed cardboard boxes were boiled in water and taste tested. The cooked product was comparable to similarly cooked conventional dry pasta. The product tasted good, had a good mouth feel, and an attractive appearance. The % solid loss during cooking was 9.17%

The moisture content of the feedstock, based on the moisture contents of the several ingredients that made up the feedstock, was calculated to be about 22%. The actual measured moisture content of the feedstock as it came out of the die was 20.08%.

The composition of the feedstock of Example 1 is shown in Table 3, below.

The values for the operational parameters of the process of Example 1 are shown in Table 4, below.

EXAMPLE 2

Elbows Produced Without The Use of a Reducing Agent in the Feedstock

The feedstock of this example was made from the same ingredients and in the same amounts as in Example 1 except that the L-cysteinehydrochloride of Example 1 was omitted in Example 2.

The ingredients of the feedstock were mixed together in the same way and for the same length of time as in Example 1. The dough was then fed into the pasta extruder without the use of vacuum, and continuously forced through the die. The dwell time in the extruder was about 300 seconds. Temperatures were recorded as follows: Barrel in: 90°; barrel out: 92°; screw in: 140°; screw out: 136°; and head temperature: 144°. The head pressure was measured at 4528 psig.

The extruded, cut pieces of this example were packaged and tested as in Example 1 with similar good results. The % solid loss during cooking was 9.78%.

The composition of the feedstock dough of Example 2 on a percent weight basis is reported in Table 3, below.

The values for the operational parameters of the process of Example 2 are reported in Table 4, below.

EXAMPLE 3

Use of a Different Feedstock Formulation

The feedstock of this example was made from the same ingredients as the feedstock of Example 1 except in differing proportions and except that the semolina had a moisture content of 13%. The feedstock was mixed, extruded and packaged as in to Example 1 and gave the similar good results.

The composition of the feedstock of Example 3 is shown in Table 3.

The operational parameters of the process of Example 3 are shown in Table 4.

EXAMPLE 4

Use of a Different Feedstock Formulation Without the Use of a Reducing Agent In The Feedstock The feedstock of this example was made from the same ingredients as Example 2 except in differing proportions and except that the Semolina had a water content of 13%. The feedstock was mixed, extruded and packaged as in to Example 2 and gave the same good results.

The composition of the feedstock on a percent weight basis is shown in Table 3.

The operational parameters of the process of Example 4 are shown in Table 4.

EXAMPLE 5

Use of a Different Feedstock Formulation Without the Use of a Reducing Agent In The Feedstock The feedstock of this example was made of the same ingredients as Example 2 except in differing proportions and except that the semolina used had a moisture content of 12.8%. The mixing procedure of this example differed from all the previous examples in that the alcohol was not mixed with the water and frozen. The mixing procedure of this example was as follows. Semolina and glyceryl monostearate were mixed together for one minute. Alcohol was then added and mixed in for 2 minutes. Ice was then added and mixing was continued for 4-6 minutes (ice completely melted).

The feedstock was extruded and packaged as in the preceding other example and gave similar good results.

The composition of the feedstock of Example 5 is reported in Table 3. The values of the operational parameters of the process of Example 5 are reported in Table 4.

TABLE 3

| COMPOSITION OF FEEDSTOCK, % BY WEIGHT | | | | | |
|---|---|---|---|---|---|
| | Example Number | | | | |
| Ingredient | 1 | 2 | 3 | 4 | 5 |
| Semolina (dry basis) | 77.690 | 77.717 | 75.723 | 75.757 | 75.75 |
| Water | 21.500 | 21.510 | 23.429 | 23.438 | 21.92 |
| Ethyl Alcohol | 0.438 | 0.439 | 0.478 | 0.478 | 1.998 |
| Glycerol Monostearate | 0.333 | 0.334 | 0.326 | 0.327 | 0.332 |
| L-cysteine-hydrochloride | 0.039 | — | 0.039 | — | — |

TABLE 4

| OPERATIONAL PARAMETERS | | | | | |
|---|---|---|---|---|---|
| | Example Number | | | | |
| Parameter Value | 1 | 2 | 3 | 4 | 5 |
| Barrel Temp. (in) | 70° F. | 90° F. | 72° F. | 70° F. | 140° F. |
| Screw Temp. (in) | 140° F. | 140° F. | 140° F. | 140° F. | 140° F. |
| Head Temp. (at die) | 142° F. | 144° F. | 138° F. | 142° F. | 133° F. |
| Pressure (at die) | 3800 psig | 4500 psig | 3000 psig | 3700 psig | 2800 psig |

CONCLUSIONS REACHED FROM EXAMPLES 1-5
(Pure Ethyl Alcohol The Only Source of Ethyl Alcohol)

The data of these examples showed that a low-moisture feedstock that contained as little as 0.438% alcohol in its feedstock could be extruded to form freshly-made pasta pieces that could be packaged without any drying step to give a satisfactory shelf stable product. In one instance, pasta pieces were packaged in a cardboard carton. The pasta stored in the cardboard box dried over a period of time to a product that looked as good and cooked up as well as conventional dry pasta. In another instance pasta pieces were stored in vapor-tight pouches and the pasta in some pouches remained aseptic while stored in the pouch over time.

It was discovered over time that mold grew in some of the vapor-tight pouches of these examples. In the cases where the extruded pasta had been placed into the pouch at the moment of extrusion so that no cooling of the extrudate took place before packaging and where thereby the extruded pasta was not exposed to ambient condition before packaging, the vapor-barrier pouches remained aseptic over time and no mold developed. In the cases where the pasta was allowed to cool and was thereby exposed to ambient conditions for a short time before packaging mold generally developed in the pouches over time. In an article by P. C. Vasavada, "Low Acid Foods Defy Liabilities" in Prepared Foods, June, 1988, pages 122-123 and 125, Vasavada states that osmophilic molds and osmophilic yeasts can survive in foods having a very low level of available water. It is theorized that in the examples being discussed osmophilic molds and/or osmophilic yeasts from the ambient air were sometimes packaged along with the pasta.

The data of these examples show that the addition of cysteinehydrochloride to the feedstock is optional. A satisfactory product was made whether the cysteinehydrochloride was used or not. However, when the cysteinehydrochloride was used a lower die pressure could be used to extrude the feedstock.

When Example 5 is compared with Example 4, it is noted that, other things being about the same (i.e., the amounts of semolina liquid and glycerol monostearate), a four-fold increase in alcohol content allowed the feedstock to be extruded at the much lower pressure of 2800 psig as compared with 4500 psig. This demonstrates that the ethanol functions as a plasicizing agent as well as a diluent.

EXAMPLES 6-22
Source of Alcohol Includes Wine

In the following examples 6-22, the same equipment and the same procedures were used as described in the previous examples. For examples 6-11, formulations are given in Table 5; parameters for extrusion are given in Table 6 and particulars about the extrudate and the packaged product are given Table 7. Similar information for examples 12-18 is given in Tables 8-10. Similar information for examples 19-22 is given in Tables 11-13.

TABLE 5

| Ingredient | 6 | 7 | 8 | 9 | 10 | 11 |
|---|---|---|---|---|---|---|
| Semolina, as is (grams) | 6000 | 6000 | 6000 | 6000 | 6000 | 6000 |
| Water (grams) | — | 24 | 57 | 52 | 207 | 11 |
| GMS[1] | — | 22.5 | 22.5 | 22.5 | 22.5 | 22.5 |
| Cysteine (grams) | 2 | 2.61 | 2.61 | 2.61 | 2.61 | 2.62 |
| Wine Kind[2] | SH. | CH. | RH. | RO. | SH. | BU |
| Alcohol Content of wine (By Vol) | 18% | 12% | 12% | 12% | 18% | 12% |
| Amount of wine (Grams) | 950 | 868 | 868 | 868 | 705 | 868 |
| Pure Ethyl Alcohol Grams | — | 5 | 5 | 5 | — | 14 |

[1] glycerol mono stearate
[2] SH = Sherry; CH = Chablis; RH = Rhine; RO = Rose; BU = Burgundy; LA = Lambrusco.

TABLE 6

Operational Parameters

| | 6 | 7 | 8 | 9 | 10 | 11 |
|---|---|---|---|---|---|---|
| Barrel Temp (in) | 140° F. | 140° F. | 140° F. | 140° F. | 140° F. | 140° F. |
| Screw Temp (in) | 140° F. | 140° F. | 140° F. | 140° F. | 140° F. | 140° F. |
| Head Temp. (at die) | 132° F. | 132° F. | 132° F. | 132° F. | 130° F. | 130° F. |
| Pressure (at die) | 3200 | 2500 | 2500 | 2500 | 2800 | 2800 |

TABLE 7

Feedstock, Extrudate and Packaged Product Evaluation

| | 6 | 7 | 8 | 9 | 10 | 11 |
|---|---|---|---|---|---|---|
| % Volatiles In Feedstock (Calculated to the nearest %) | 24 | 24 | 24 | 24 | 24 | 24 |
| (at die) | 21.49 | 22.16 | 21.56 | 21.67 | 21.65 | 21.83 |
| % Alcohol In Extrudate (Small Elbows) | | | | | | |
| (calculated) | 2 | 1.5 | 1.5 | 1.5 | 1.5 | 1.5 |
| (at Die) | 1.57 | 0.91 | 0.74 | 0.91 | 1.17 | 1.16 |
| Appearance of Extrudate Product From | dull yellow | pale yellow | pale yellow | tan yellow | pale yellow | grey yellow |

TABLE 7-continued

Feedstock, Extrudate and Packaged Product Evaluation

| | Example Number | | | | | |
|---|---|---|---|---|---|---|
| | 6 | 7 | 8 | 9 | 10 | 11 |
| Cardboard Box (After One Week Storage) | | | | | | |
| Volatiles | 7.96 | 10.56 | 10.32 | 10.57 | 10.22 | 9.86 |
| Texture of Cooked Elbows (Mouth feel) | good | good | very good | very good | very good | very good |
| % Solids Loss During Cooking | 11 | 8.4 | 8.5 | 8.8 | 8.6 | 8.6 |

The vapor-barrier pouch packaged product of each of these examples was stored under grocery-shelf conditions and checked at regular intervals. After four months of packaging the product in the pouches were observed and found to still be in the same good condition as it was at the time of packaging. There was no mold growth of any kind.

TABLE 8

| Ingredient | Example Number | | | | | | |
|---|---|---|---|---|---|---|---|
| | 12 | 13 | 14 | 15 | 16 | 17 | 18 |
| Flour[1] Durum (grams) | 6000 | 6000 | 6000 | 6000 | 6000 | 6000 | 6000 |
| Water (grams) | 253 | — | — | 538 | — | — | 36.4 |
| Cysteine (grams) | 2.1 | 2.1 | 2.1 | 2.1 | 2.1 | 2.1 | 2.08 |
| Egg White (grams) | 180 | 180 | 180 | 180 | 180 | 180 | 180 |
| Wine Kind | SH. | LA. | BU. | SH. | BU. | BU. | RH |
| Alcohol Content of wine (by Vol.) | 18% | 8.5% | 12.5% | 18% | 12.5% | 12.5% | 12% |
| Amount of wine (grams) | 733 | 1205 | 950 | 367 | 950 | 950 | 876 |
| Pure Ethyl Alcohol (grams) | — | 24.7 | 11 | 54 | 11 | 11 | 25.8 |
| Other (grams) | — | — | — | — | 30[2] | 43[3] | — |

[1] Extra Fancy Patent Durum Flour (King Midas)
[2] Grape skin extract
[3] Beet juice concentrate

TABLE 9

| Parameter Value | Example Number | | | | | | |
|---|---|---|---|---|---|---|---|
| | 12 | 13 | 14 | 15 | 16 | 17 | 18 |
| Barrel Temp (in) | 100° F. | 100° F. | 100° F. | 100° F. | 100° F. | 100° F. | 100° F. |
| Screw Temp. (in) | 100° F. | 100° F. | 100° F. | 100° F. | 100° F. | 100° F. | 100° F. |
| Head Temp (at die) | 132 | 131 | 130 | 132 | 137 | 135 | 132 |
| Pressure (at die) lbs/in$^2$ | 3000 | 2500 | 3000 | 2100 | 2900 | 3000 | 3000 |

TABLE 10

Feedstock, Extrudate and Packaged Product Evaluation

| | Example Number | | | | | | |
|---|---|---|---|---|---|---|---|
| | 12 | 13 | 14 | 15 | 16 | 17 | 18 |
| Feedstock % Volatiles in Feedstock (calculated) | 24 | 24 | 24 | 24 | 24 | 24 | 24 |

TABLE 10-continued

Feedstock, Extrudate and Packaged Product Evaluation

| | Example Number | | | | | | |
|---|---|---|---|---|---|---|---|
| | 12 | 13 | 14 | 15 | 16 | 17 | 18 |
| (at die) | 22.26 | 22.56 | 19.84 | 20.59 | 20.55 | 20.45 | 21.45 |
| % Alcohol In Extrudate (Small Elbows) | | | | | | | |
| (Calculated) | 1.5 | 1.5 | 1.5 | 1.5 | 1.5 | 1.5 | 1.5 |
| (at die) | 1.19 | 1.26 | 1.35 | 1.41 | 1.22 | 1.2 | 1.4 |
| Appearance of Extrudate | tan yellow | brown | dark brown | pale yellow | dark purple | red brown | light yellow |
| Product From Cardboard Box (One Week) | | | | | | | |
| % Moisture | 9.94 | 9.61 | 9.34 | 9.99 | 10.08 | 9.58 | 10.12 |
| Texture Of Cooked Elbows (Mouth Feel) | good | good | good | fair | fair | fair | fair |
| % Solid Loss during cooking | 10.1 | 10.6 | 9.4 | 13.7 | 16.5 | 11.3 | 10.3 |

The vapor-barrier pouch packaged product of each of these examples was stored under grocery-shelf conditions and checked at regular intervals. After four months of packaging the product in the pouches were observed and found to still be in the same good condition as it was at the time of packaging. There was no mold growth of any kind. Samples of the product were cooked as described in Example 1 with similar good results except for Example 16. The product of Example 16, when cooked, had an unacceptable product loss (i.e., more than 15%). It is contemplated that a product such as this one might be acceptable using new cooking directions.

TABLE 11

| | Example Number | | | |
|---|---|---|---|---|
| Ingredient | 19 | 20 | 21 | 22 |
| Flour[1] Durum (grams) | 6000 | 6000 | 6000 | 6000 |
| Water | — | 250 | 11 | 13 |
| Calcium Hydroxide | 10[2] | 1.17 | 11 | 1.5 |
| Cysteine (grams) | 2.2 | 2.2 | 2.2 | 2.2 |
| Egg White (dry) | 180 | 180 | 180 | 180 |
| Wine Kind | BU. | SH. | CH. | SH |
| % Alcohol Content of wine (by Vol) | 12% | 18% | 12% | 18%[4] (before being boiled) |
| Amount of wine (grams) | 823 | 733 | 937 | 937 |
| Yeast (dry) | 10 | 10 | 10 | 10 |
| Pure Ethyl Alcohol (grams) | 23.16 | — | 16 | — |
| Other | [3] | — | — | — |

[1]Extra Fancy Patent Durum Flour (King Midas).
[2]In this example only, sodium hydroxide was used instead of calcium hydroxide.
[3]Other ingredients are beet juice concentrate, 43 grams; and burgundy wine flavor, 6 grams.
[4]Wine was boiled before being used.

TABLE 12

Operational Parameters

| | Example Number | | | |
|---|---|---|---|---|
| Parameter Value | 19 | 20 | 21 | 22 |
| Barrel Temp. | 100° F. | 100° F. | 130° F | 100° F. |
| Screw Temp (in) | 100° F. | 100° F. | 130° F. | 100° F. |
| Head Temp (at die) | 125° F. | 136° F. | 133° F. | 136° F. |
| Pressure (at die) lb's/sq. inch | 3800 | 3000 | 4000 | 3400 |

TABLE 13

Feedstock Extrudate and Packaged Product Evaluation (1)

| | Example Number | | | |
|---|---|---|---|---|
| | 19 | 20 | 21 | 22 |
| Feedstock | | | | |
| % Volatiles In Feedstock (Calculated) | 23 | 23 | 23 | 23 |
| At die | 19.25 | 20.3 | 21.54 | 20.65 |
| % Alcohol In Extrudate (Small Elbows) Calculated | 1.5 | 1.5 | 1.5 | — |
| Actual | 1.36 | 1.42 | 1.37 | — |
| Appearance of Extrudate Product From Cardboard Box (One Week) | Red-Brown | Yellow Tan | Yellow Tan | Yellow Tan |
| % Volatiles | 10.4 | 9.28 | 11.22 | 9.88 |
| Texture of Cooked Elbows (Mouth Feel) | good | fair | very good | fair |
| % Solid Loss During Cooking | 11.2 | 10.6 | 24.6 | 9.3 |

Except for Example 22, which is discussed separately below, the vapor-barrier pouch packaged product of each of these examples was stored under grocery-shelf conditions and checked at regular intervals. After four months of packaging the product in the pouches was observed and found to still be in the same good condition as it was at the time of packaging. There was no mold growth of any kind. Samples of the product from the cardboard boxes were cooked as described in Example 1 with similar good results except for Example 21. The product of Example 21, when cooked, had an unacceptable product loss (i.e., more than 15%). It is contemplated that a product such as this one might be acceptable using new cooking directions.

Example 22 is a control. In Example 22, the feedstock was essentially free of alcohol because the wine in the feedstock was boiled before it was used. The extruded pasta of this example that was packaged in vapor-barrier pouches did not keep, i.e., mold grew inside the package. The extruded pasta of this example that was packaged in cardboard cartons dried out to give a product with surface cracks and a generally unattractive appearance that would make the product unacceptable to consumers.

Conclusions Reached From Examples 6–21 Wherein Wine Is Used As A Source of Ethyl Alcohol Based On Pouches Stored For Four Months In each example of this set of examples (i.e. examples 6–21) wine-containing pasta of the invention was packaged in vapor-barrier pouches without any additional processing. The packaged pasta kept its fresh qualities with no mold growth of any kind for at least four months. The test is on going and the pasta in the pouches is expected to keep indefinitely. It was shown by these examples that the small amount of yeast and mold inhibitor that was in the wine was responsible for the fact that no mold growth took place in the pouches. In examples 19, 20, and 21, yeast was deliberately incorporated into the feedstock as a challenge. In all the examples of this set, the wine-containing pastas that were packaged in vapor-barrier pouches kept their fresh qualities with no mold growth of any kind for at least four months. It was therefore shown that the 0.1% weight of potassium sorbate in the wine was sufficient to inhibit the growth of the yeast. The calculated amount of potassium sorbate in the feedstock of all the examples was within the range of 0.1% –0.2%.

In example 19 sodium hydroxide was added to the feedstock and in examples 20–21, calcium hydroxide was added to the feedstock. The purpose of the hydroxide was to neutralize the acidity of the wine and thereby eliminate an acidic taste component.

Further Conclusions Reached From Examples 6–21 Based On Pouches Stored For Six Months The vapor-barrier pouches of pasta of examples 16–21 are undergoing continued storage testing and the results obtained after six months of storage are as follows. In examples 6–18, the examples in which no yeast was deliberately added to the pasta feedstock as a challenge, the same good results were observed. No mold growth was observed in the pouches and the pasta maintained its good keeping qualities. In examples 19–21, the examples in which yeast was deliberately added to the pasta feedstock as a challenge, yeast growth was observed in pouches starting with about the fifth month. These tests show that in the embodiment of the invention in which the pasta is packaged in vapor-barrier pouches, the pasta will keep on the grocers shelf for at least six months if an inhibitor for yeast and mold has been incorporated into the feedstock of the pasta and the pasta is packaged under normal conditions. The tests seem to show that if the pasta is to keep indefinitely (i.e., for a year or more rather than months) it would be prudent to package the freshly extruded pasta under conditions which will not allow any yeast or mold to enter the pouch. Alternatively, it would be prudent to heat treat the filled and sealed vapor-barrier pouch in that known ways to prevent the growth of any molds or yeasts may have entered the pouch at the time of filling.

EXAMPLES 23–30

Composition of Feedstock Includes Whey Protein

In the following examples, examples 23–30, the same equipment and the same procedures were used as described in the previous examples. For these examples (23–30), formulations are given in Table 14; parameters for extrusion are given in Table 15 and particulars about the extrudate and the packaged product are given in Table 16.

The whey protein concentrates that were used in these examples were obtained in fifty pound lots from Dairyland Products, Inc., a company located in Minnesota. Each lot was labeled to indicate the percent by weight of whey protein in the concentrate.

TABLE 14

| Ingredients (in grams) | Example No. | | | | | | | |
|---|---|---|---|---|---|---|---|---|
| | 23 | 24 | 25 | 26 | 27 | 28 | 29 | 30 |
| Extra Fancy Patent durum flour, (King Midas) | 6000 | 6000 | 6000 | 6000 | 6000 | 6000 | 6000 | 6000[1] |
| Water | 11 | — | 35.6 | 35.6 | 35.6 | 35.6 | 35.6 | 753 |
| Cysteine | — | 1.1 | 1.07 | 1.07 | 1.07 | 1.07 | 1.07 | 1.08 |
| Chablis Wine (Monarch) 12% alcohol by volume | 937 | 765 | 709 | 709 | 709 | 709 | 709 | — |
| Calcium Hydroxide | 2.5 | 2.5 | 2.5 | 2.5 | 2.5 | 2.5 | 2.5 | — |
| Yeast | 10 | 10 | 10 | 10 | 10 | 10 | 10 | — |
| Ethyl Alcohol | 16 | 64 | 70.4 | 70.4 | 70.4 | 70.4 | 70.4 | 103 |
| Whey Protein Concentrate (95% Whey Protein) | 180 | — | — | — | — | — | — | — |
| Whey Protein Concentrate (78% Whey Protein) | — | 120 | — | — | — | — | — | — |
| Whey Protein Concentrate (34% Whey Protein) | — | — | 120 | 120 | 120 | 120 | 120 | 120 |

[1]In this example, the flour used was Exp. Hi-yield SO$_2$ tempered durum flour (Con-Agra).

TABLE 15

| PARAMETER VALUE | EXAMPLE NUMBER | | | | | | | |
| --- | --- | --- | --- | --- | --- | --- | --- | --- |
| | 23 | 24 | 25 | 26 | 27 | 28 | 29 | 30 |
| Barrel Temp (in) | 130° F. | 130° F. | 110° F. | 120° F. | 130° F. | 140° F. | 150° F. | 130° F. |
| Screw Temp (in) | 130° F. | 130° F. | 110° F. | 120° F. | 130° F. | 140° F. | 150° F. | 130° F. |
| Head Temp (at die) | 135° F. | 139° F. | 112° F. | 121° F. | 129° F. | 139° F. | 151° F. | 132° F. |
| Pressure (at Die) lbs/in$_2$ | 2500 | 2500 | 4000 | 3500 | 3200 | 2500 | 2200 | 3800 |

TABLE 16

| FEEDSTOCK | EXAMPLE NUMBER | | | | | | | |
| --- | --- | --- | --- | --- | --- | --- | --- | --- |
| | 23 | 24 | 25 | 26 | 27 | 28 | 29 | 30 |
| % Volatiles In Feedstock (Calculated) | 23 | 22 | 21 | 21 | 21 | 21 | 21 | 21.5 |
| At Die | 19.94 | 18.16 | — | — | — | — | — | 19.2 |
| % Alcohol In Extrudate (Small Elbows Calculated | 1.5 | 2 | 2 | 2 | 2 | 2 | 2 | 1.5 |
| Actual | 1.23 | 1.86 | — | — | — | — | — | 1.3 |
| Appearance of Extrudate Product From Vapor Barrier Pouch (One Week) | Normal | Normal | Yellow Green | Dull Yellow | Yellow | Yellow | Light Yellow | Yellow |
| Texture of Cooked Elbows (Mouth Feel) | — | Fair | — | — | Best | — | — | Good |

In each of the examples of this set of examples (i.e. examples 23-30), whey protein concentrate was included as one of the ingredients in the feedstock. In examples 23 and 24, comparatively high amounts of whey protein were in the feedstock and the texture of the cooked product was deemed fair. In the other examples (i.e. examples 25-30), a lesser amount of whey protein was in the feedstock. The amount of whey protein being the same for each example. The texture of the cooked product was determined for example 27 and example 30 and the texture of each product was good. The best textured product was deemed to be the product in example 27.

CONCLUSIONS REACHED FROM EXAMPLES 23-30

An acceptable product of the invention can be made from a feedstock that includes whey protein. The pasta of example 27 was judged to be about the best pasta product made according to the invention.

CONCLUSIONS: GENERAL

It is contemplated that the pasta of this invention can be made using any commercially available pasta making equipment that is capable of extruding or sheeting conventional pasta feedstock at a temperature of 120° F.

The use of glycerol monostearate in the feedstock of this invention is optional. If glycerol monostearate is not used, an appropriate adjustment of the temperature and the pressure used at the die will be necessary so that the pasta extrudes uncooked.

The satisfactory dried pasta products obtained by the process of this invention as shown by the examples comes about because of the use of the low levels of ethanol in the feedstock. The ethanol serves a dual role. The ethanol acts as a preservative for a period of time during which the water content of the pasta is high enough to support microbial activity, i.e. spoilage. The ethanol is a protein modifier wherein it solubilizes the protein in the flour and thereby disrupting the shape of the protein chain allowing the protein to flow better around each discrete starch particle of the flour. The result is a softening of the pasta dough which facilitates extrusion at low moisture levels. When the extruded product is dried at ambient conditions without any conventional drying step, the product does not crack or exhibit streaks as would be evident in the absence of alcohol.

The extruded product of the invention is not exposed to heated drying at all, but is cut into noodles and can be immediately packaged in at least 2 ways. It can immediately be sealed in an impermeable pouch whereby some ethanol remains in the pasta product until put in water and boiled, at which time the ethanol quickly volatilizes, or it can be immediately put in a standard porous cardboard box. Prior art pasta not heat-dried but put in a cardboard box would spoil and/or crack. The presence of the ethanol in the product inhibits spoilage while the product is drying down to an equilibrium of 11-12% moisture. The resulting product retains the desirable golden yellow color, has good pasta taste and texture and exhibits excellent dry shelf stability.

While the invention has been disclosed by reference to the details of preferred embodiments, this disclosure is intended in an illustrative rather than in a limiting sense, as it is contemplated that modifications will readily occur to those skilled in the art, within the spirit of the invention and the scope of the appended claims.

What is claimed is:

1. A process for preparing shaped pieces of alimentary paste which comprises
   (a) preparing a mixed feedstock comprising glutinous flour, ethyl alcohol and water, to form an alimentary paste having a total moisture content at or below about 26 weight percent by weight of said feedstock, wherein the amount of the ethyl alcohol in said feedstock is not less than 0.1 weight percent and not more than about 10 percent by weight of said feedstock;

(b) extruding or sheeting said mixed feedstock under pressure, at a temperature within the extruder sufficient to reduce the viscosity of the paste so as to be extrudable or sheetable at a desired pressure, said temperature being one at which the extruded or sheeted alimentary paste has a level of starch gelatinization below 20 weight percent of the total starch content in said extruded or sheeted alimentary paste; and then (c) forming said extrudate or said sheet into individual pasta pieces.

2. The process of claim 1 wherein said pasta pieces are packaged and sealed in a container made of vapor barrier material.

3. The process of claim 1 wherein said pasta pieces are packaged in a container made of vapor permeable material.

4. A process as in claim 1 wherein the glutinous flour is selected from the group consisting of semolina flour, durum flour and mixtures thereof.

5. A process as in claim 1 wherein the feedstock is premixed prior to feeding to the extruder.

6. A process as in claim 1 wherein the glutinous flour is fed into the extruder separately from the alcohol and water.

7. A process as in claim 1 wherein the feedstock further comprises additives selected from the group consisting of: non-glutinous flour, seasoning, flavoring, dried egg, dye, vitamins, dried vegetable, whey protein, and mixtures thereof, with the concentration of glutinous flour being at least 75% by weight of the ingredients on a dry basis in said feedstock.

8. A process as in claim 7 wherein the non-glutinous flour is rice, the seasoning is salt, the dried vegetable is spinach, and the flavoring is selected from the group consisting of cheese, chicken and beef.

9. A process as in claim 1 wherein the feedstock additionally comprises glycerol monostearate.

10. A process as in claim 1 wherein the feedstock additionally comprises a sulfhydryl reducing agent selected from the group consisting of sodium bisulfite, calcium sulfite and L-cysteine.

11. A process for preparing alimentary paste which comprises (a) preparing a mixed feedstock comprising glutinous flour, ethyl alcohol and water to form an alimentary paste having a total moisture content at or less than about 26 weight percent by weight of said feedstock, the amount of the ethyl alcohol in said feedstock being not less than 0.1 weight percent and not more than 10 weight percent by weight of said feedstock;

(b) extruding or sheeting said alimentary paste under pressure, at a temperature within the extruder sufficiently low to maintain the level of starch gelatinization below 10 weight percent of the total starch content in said extruded or sheeted alimentary paste; and (c) forming said extrudate or said sheet into individual pasta pieces.

12. The process of claim 11 wherein said pasta pieces are packaged and sealed in a vapor barrier container.

13. The process of claim 11 wherein said pasta pieces are packaged in a vapor permeable container.

14. A process as in claim 11 wherein the glutinous flour is selected from a group consisting of semolina flour, durum flour and mixtures thereof.

15. A process for preparing packaged shaped alimentary paste which comprises (a) preparing a mixed feedstock comprising glutinous flour, ethyl alcohol and water to form an alimentary paste having a total moisture content in the range from about 14% to about 26% by weight of the paste, the amount of ethyl alcohol in said feedstock being not less than 0.1 weight percent and not more than 10 weight percent by weight of said feedstock;

(b) extruding or sheeting said alimentary paste under pressure;

(c) forming the extruded or sheeted pasta into pieces, and then (d) packaging said pasta pieces;

wherein said pasta pieces are not subjected to a drying step before packaging.

16. The process of claim 15 wherein said pasta pieces are packaged in a vapor barrier container.

17. The process of claim 15 wherein said pasta pieces are packaged in a vapor permeable container.

18. A process for the manufacture of an alimentary paste product which comprises (a) preparing a mixed feedstock comprising glutinous flour, ethyl alcohol and water, to form an alimentary paste having a total moisture content at or below about 26% weight percent wherein the amount of ethyl alcohol in said feedstock is not less than 0.1 weight percent and not more than 10 weight percent by weight of said feedstock;

(b) extruding said alimentary paste through holes in an extruder die by internal pressure, wherein the temperature of the alimentary paste within the extruder attains a value at or above about 70° (21° C.) but which is sufficiently low so as to maintain the level of starch gelatinization below 20 weight percent of the total starch content within said extruded alimentary paste; and (c) permitting said pasta pieces to dry at ambient temperature.

19. A process for the manufacture of consumer acceptable packaged uncooked pasta pieces comprising the steps of (1) mixing up a feedstock comprising semolina, water, glycerol monostereate and ethyl alcohol wherein the semolina content, dry basis, of said feedstock is 76%–82%, the total moisture content of said feedstock is 18% to 26%, the glycerol monostearate content of said feedstock is 0.1%–2% and the alcohol content of said feedstock is 0.1%–10%, all of said percentages being by weight based on the weight of said feedstock, (2) extruding said feedstock through a die at a pressure and temperature to extrude the pasta in an uncooked form, and (3) immediately cutting or separating the extruded pasta into pieces and packaging said pasta pieces in a closed container.

20. A process for preparing packaged shaped alimentary paste which comprises (a) preparing in an extruder that is equipped with a die having a plurality of holes a mixed feedstock comprising glutinous flour, ethyl alcohol and water to form an alimentary paste having a total moisture content in the range from about 14% to about 26% by weight of the paste, the amount of ethyl alcohol in said feedstock being not less than 0.1 weight percent and not more than 10 weight percent by weight of said feedstock;

(b) extruding or sheeting said alimentary paste under pressure, while maintaining the barrel temperature of the extruder at from about 70° F. (21° C.) to about 140° F. (60° C.), and the head temperature at from about 120° F. (48.9° C.) to about 160° F. (71.1° C.); and (c) forming the extruded or sheeted pasta into pieces.

21. The process of claim 1 wherein said amount of ethyl alcohol in said feedstock is not more than 2 percent 22. The process of claim 1 wherein an alcoholic beverage is added to said feedstock and wherein all or part of said ethyl alcohol in the feedstock is the ethyl alcohol contained in said alcoholic beverage, said alcoholic beverage being selected from a group consisting of wine, beer, distilled liquors and mixtures thereof.

23. The process of claim 11 wherein said amount of ethyl alcohol is not more than 2 percent.

24. The process of claim 11 wherein an alcoholic beverage is added to said feedstock and wherein all or part of said ethyl alcohol in the feedstock is the ethyl alcohol contained in said alcoholic beverage, said alcoholic beverage being selected from a group consisting of wine, beer, distilled liquors and mixtures thereof.

25. The process of claim 15 wherein said amount of ethyl alcohol is not more than 2 percent.

26. The process of claim 15 wherein an alcoholic beverage is added to said feedstock and wherein all or part of said ethyl alcohol in the feedstock is the ethyl alcohol contained in said alcoholic beverage, said alcoholic beverage being selected from the group consisting of wine, beer, distilled liquors and mixtures thereof.

27. The process of claim 2 wherein said feedstock further comprises up to about 0.2% by weight yeast and mold inhibitor based on the weight of said feedstock.

28. The process of claim 27 wherein said yeast and mold inhibitor is selected from the group consisting of sodium propionate, potassium propionate, sodium sorbate, potassium sorbate and mixtures thereof.

29. The process of claim 2 wherein after said pasta pieces are packaged and sealed in said container, the container is subjected to a heat-treatment sufficient to kill any yeasts or molds within said container.

30. The process of claim 12 wherein said feedstock further comprises up to about 0.2% by weight yeast and mold inhibitor based on weight of said feedstock.

31. The process of claim 30 wherein said yeast and mold inhibitor is selected from a group consisting of sodium propionate, potassium propionate, sodium sorbate, potassium sorbate and mixtures thereof.

32. The process of claim 2 wherein a source of said ethyl alcohol is wine.

33. The process of claim 12 wherein a source of said ethyl alcohol is wine.

34. The process of claim 16 wherein a source of said ethyl alcohol is wine.

35. The process of claim 20 wherein a source of said ethyl alcohol is wine, beer, distilled spirits or mixtures thereof.

36. A process for preparing shaped alimentary paste which comprises (a) preparing a mixed feedstock comprising glutinous flour, ethyl alcohol, whey protein, and water, to form an alimentary paste having a total moisture content at or below about 26 weight percent by weight of said feedstock, wherein the amount of the ethyl alcohol in said feedstock is not less than 0.1 percent and not more than about 10 percent by weight of said feedstock;

(b) extruding or sheeting said mixed feedstock under pressure, at a temperature within the extruder sufficient to reduce the viscosity of the paste so as to be extrudable or sheetable at a desired pressure, said temperature being one at which the extruded or sheeted alimentary paste has a level of starch gelatinization below 20 weight percent of the total starch content in said extruded or sheeted alimentary paste; and then (c) forming said extrudate or sheets into individual pasta pieces.

37. The process of claim 36 wherein said pasta pieces are packaged and sealed in a container made of vapor barrier material.

38. The process of claim 36 wherein said pasta pieces are packaged in a container made of vapor permeable material.

39. The process of claim 11 wherein said mixed feedstock further comprises whey protein.

40. The process of claim 15 wherein said mixed feedstock further comprises whey protein.

* * * * *